(12) United States Patent
Visagie

(10) Patent No.: US 6,176,778 B1
(45) Date of Patent: Jan. 23, 2001

(54) THRESHING OF HARVESTED GRAIN

(75) Inventor: Andrie Diederich Visagie, Bothaville (ZA)

(73) Assignee: Modimp (Proprietary) Limited, Bothaville (ZA)

( * ) Notice: Under 35 U.S.C. 154(b), the term of this patent shall be extended for 0 days.

(21) Appl. No.: 09/125,348

(22) PCT Filed: Feb. 18, 1987

(86) PCT No.: PCT/US97/02432

§ 371 Date: Aug. 18, 1998

§ 102(e) Date: Aug. 18, 1998

(87) PCT Pub. No.: WO97/29628

PCT Pub. Date: Aug. 21, 1997

(30) Foreign Application Priority Data

Feb. 20, 1996 (ZA) .................................................. 96/1339

(51) Int. Cl.⁷ .............................. A01F 11/06; A23N 5/00; B02B 3/00
(52) U.S. Cl. ................................. 460/45; 460/46; 460/99; 460/143
(58) Field of Search .................... 460/45, 46, 58, 460/99, 16, 141, 142, 143

(56) References Cited

U.S. PATENT DOCUMENTS

| | | | |
|---|---|---|---|
| 1,850,279 | * 3/1932 | Dieterich | 460/45 |
| 2,210,821 | * 8/1940 | Sharp | 460/45 |
| 2,222,282 | * 11/1940 | Court | 460/45 |
| 2,271,897 | * 2/1942 | Mast | 460/45 |
| 2,344,235 | * 6/1944 | Crumb et al. | 460/45 |
| 2,484,999 | * 10/1949 | Hyman | 460/45 |
| 3,348,780 | 10/1967 | Barkstrom et al. | 241/101 |
| 3,401,727 | 9/1968 | Blanshine et al. | 146/71 |
| 3,401,729 | * 9/1968 | Wallin et al. | 460/46 |
| 3,536,077 | * 10/1970 | Stott et al. | 460/46 |
| 3,844,293 | 10/1974 | Young | 130/6 |
| 5,017,177 | 5/1991 | Mitkov et al. | 460/46 |

* cited by examiner

Primary Examiner—Robert E. Pezzuto
Assistant Examiner—Arpad Fabian Kovacs
(74) Attorney, Agent, or Firm—Husch & Eppenberger, LLC; Robert E. Muir; Kevin M. Kercher

(57) ABSTRACT

Harvested grain in the form of including ears, pods to be threshed are transported axially into an inclined threshing zone. Grain is liberated and falls through a sieve forming a bottom of the threshing zone. Most of the lightweight material or chaff is carried to an exit by a fan generated airflow stream. Grain and some chaff falling through the sieve are collected in a trough below the sieve. A fan generated auxiliary airflow stream carries most of the remaining chaff to the exit. The larger portion of the grain slides down the trough to exit. The balance of the grain with virtually no entrained chaff exits the trough via an auxiliary grain exit. Transverse baffles, in tandem, opposing relationship, cause airflow to be circuitous to promote grain in preference to chaff to enter the exit. A final cleaning step may be performed in a cleaning apparatus.

12 Claims, 2 Drawing Sheets

THRESHING OF HARVESTED GRAIN

FIELD OF THE INVENTION

THIS INVENTION relates to the threshing of harvested grain. It relates more specifically to a method of threshing harvested grain and to harvesting apparatus.

It is envisaged that the invention will find application in the field of threshing of grain like maize (corn), wheat, beans, and the like, more particularly in the field of harvesting grain having lightweight or small, or both lightweight and small grain kernels such as wheat.

For purposes of this specification, the term "threshing" (and derivatives thereof) should be interpreted as including threshing, separating and cleaning (and corresponding derivatives thereof).

SUMMARY OF THE INVENTION

In accordance with a first aspect of the invention, there is provided a method of threshing harvested grain in the form of ears, pods, and the like, the method including performing a threshing action on the harvested grain in a threshing zone which is bounded, at least along a lower extremity thereof, by a sieve, causing an air flow stream of predetermined force or intensity to move through the threshing zone, perforations of the sieve being selected to pass grain liberated during threshing with little clearance, the force or intensity of the air flow stream being predetermined generally such as to carry chaff (of relatively low density) out of the threshing zone and to allow liberated grain (of relatively high density) to fall onto the sieve;

gathering grain and smaller portions of chaff passed by the sieve in a trough spaced underneath the sieve;

causing an auxiliary air flow stream of predetermined force or intensity to move through a space intermediate the sieve and the trough to carry such smaller portions of chaff out of said space while allowing the grain to fall into the trough;

providing a main grain exit for the trough toward an end of the trough which is an upstream end relative to said auxiliary air flow stream and causing a major portion of the grain to move toward and to exit via said main grain exit;

providing an auxiliary grain exit through the trough toward an end thereof which is a downstream end relative to said auxiliary air flow stream to allow the grain remaining in the trough and any remaining chaff to pass through the auxiliary grain exit.

For economy of writing, for purposes of this specification, terms denoting direction or relative position such as "upstream" and "downstream" must be interpreted in relation to the direction of flow of the auxiliary air flow stream.

Advantageously, the method may include barring a portion of the space intermediate the sieve and the trough, at a longitudinal position closely downstream of the auxiliary grain exit, by means of a transverse end baffle extending from a bottom of the trough.

By way of development, even more advantageously, the method may include barring a portion of the space intermediate the sieve and the trough also at a longitudinal position opposite the auxiliary grain exit and upstream of said transverse end baffle by means of a transverse intermediate baffle extending from the sieve, to cause the auxiliary air flow stream to follow a circuitous route past the intermediate and end baffles. In such a circuitous air flow stream, the lighter particles, i.e. the chaff, will be influenced largely by the effect of the air flow stream and will tend to follow the air flow stream. In contrast, the heavier particles, i.e. the grain, will be influenced less by the air flow stream because of their higher inertia and will tend to follow tangential paths. Thus, by creating the circuitous route by means of the baffles, the grain will tend to be directed toward and into the auxiliary grain exit to a larger extent than the chaff.

A preferred method may include arranging the threshing zone and the trough generally parallel at an inclined attitude such that the directions of flow of the air flow stream and the auxiliary air flow stream are obliquely upwardly. The inclined attitude may be at least about 20°, preferably at least about 30°, most preferably about 45°. The invention is, however, not limited to the inclined attitude, and a horizontal and even vertical arrangement fall within the scope of this invention.

The method may include recirculating the grain and any chaff from the auxiliary grain exit to the threshing zone.

Instead, the method may include passing the grain and any chaff from the auxiliary grain exit to a cleaning zone which is bounded at least along a lower extremity thereof by a sieve, the auxiliary grain exit being directed at said sieve;

agitating or stirring said grain and chaff; and causing a cleaning air flow stream of predetermined force or intensity to move through the cleaning zone, perforations of the sieve being selected to pass cleaned grain with little clearance, the force or intensity of the cleaning air flow stream being predetermined generally such as to carry chaff (of relative low density) out of the cleaning zone and to allow cleaned grain (of relatively high density) to fall onto the sieve.

In addition, the method may include transporting grain (conveniently under gravity) from the main grain exit to an inlet of the cleaning zone at a longitudinal position spaced upstream, in relation to the cleaning air flow stream, of the auxiliary grain exit, subjecting said grain from the main grain exit to the cleaning air flow stream to carry any chaff off and to allow grain to pass through the sieve. It is contemplated that, generally, all of the grain from the main grain exit will pass through the sieve before a longitudinal position, where grain from the auxiliary grain exit enters the cleaning zone, is reached. Thus, it is contemplated that grain from the respective exits will not mix in a zone above the sieve in the cleaning zone.

In other methods, cleaning may be effected conventionally, e.g. in a shaker sieve or reciprocating sieve cleaning apparatus.

In accordance with a second aspect of this invention, there is provided threshing apparatus suitable for use in threshing harvested grain in the form of ears, pods, or the like, the threshing apparatus comprising a casing defining a threshing zone and including a sieve bounding at least a lower extremity of the threshing zone;

transport means arranged to transport the harvested grain into the threshing zone;

threshing means arranged to thresh the harvested grain in the threshing zone;

air flow stream generating means arranged to move air in an air flow stream through the threshing zone;

a trough spaced underneath the sieve;

auxiliary air flow generating means arranged to move air in an auxiliary air flow stream through the space intermediate the sieve and the trough;

a main grain exit toward an end of the trough which is an upstream end in relation to the auxiliary air flow stream and an auxiliary grain exit therethrough toward a downstream end of the trough, the arrangement being such that grain, liberated during threshing, falls onto the sieve, perforations of the sieve being selected to pass such liberated grain with little clearance, such that chaff is carried in the air flow stream out of the threshing zone, such that grain and smaller portions of chaff passed by the sieve fall toward the trough to be exposed to the auxiliary air flow stream, the smaller portions of chaff being carried out of the space on the auxiliary air flow stream, such that a major portion of the grain exit the space via the main grain exit, and such that the balance of the grain, and any chaff remaining in the grain, exit the space via the auxiliary grain exit.

Advantageously, the threshing zone may be generally round cylindrical, having a threshing axis which is inclined at an angle of at least 20° (preferably at least 30°, most preferably about 45°) from the horizontal, the sieve being correspondingly cylindrically arcuate or convex and being arranged generally concentrically of the threshing axis, the trough being arranged generally parallel to and underneath the sieve.

By way of development, the threshing apparatus may include a transverse end baffle extending upwardly from the trough partially into a space intermediate the trough and the sieve at a longitudinal position closely downstream of the auxiliary grain exit to bar a corresponding portion of said space. By way of further development, in addition, the threshing apparatus may include a transverse intermediate baffle extending downwardly from the sieve partially into said space at a longitudinal position opposite the auxiliary grain exit, to bar a corresponding portion of said space, thus to cause the auxiliary air flow stream to follow a circuitous route past the intermediate and end baffles in use.

In an advanced embodiment intended to provide a particularly clean sample, the threshing apparatus may include a casing defining a cleaning zone which is exposed to said auxiliary grain exit;

a sieve bounding at least a lower extremity of the cleaning zone;

agitating or stirring means arranged to agitate or stir grain and any chaff it may contain received in the cleaning zone from the auxiliary grain exit; and cleaning air flow stream generating means arranged to move air in a cleaning air flow stream through the cleaning zone, the arrangement being such that grain, cleaned during agitating or stirring, falls onto the sieve, perforations of the sieve being selected to pass such cleaned grain with little clearance, and such that chaff is carried in the cleaning air flow stream out of the cleaning zone.

If desired, the threshing apparatus may include a passage from the main grain exit to an inlet of the cleaning zone upstream of and spaced from the exit of the auxiliary grain exit. The passage may extend generally downwardly to cause grain from the main grain exit to flow to the cleaning zone under gravity.

BRIEF DESCRIPTION OF THE DRAWINGS

The invention is now described by way of example with reference to the accompanying diagrammatic drawings. In the drawings

DESCRIPTION OF THE PREFERRED EMBODIMENTS

Figure 1:
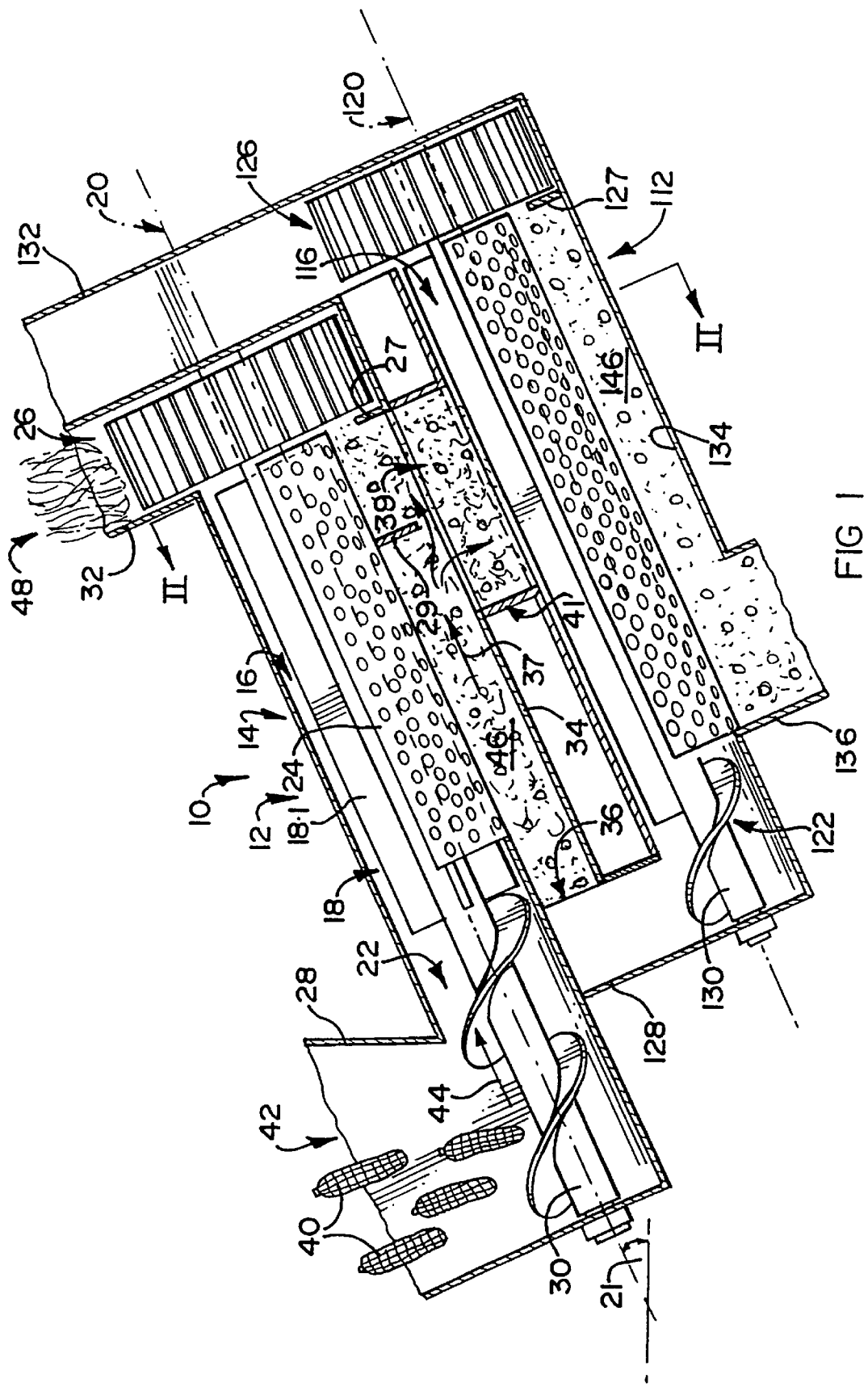
FIG. 1 shows, in axial section, threshing apparatus in accordance with the invention.

With reference to the drawings, threshing apparatus in accordance with the invention is generally indicated by reference numeral 10. The threshing apparatus is composite threshing apparatus comprising first apparatus in the form of threshing apparatus generally indicated by reference numeral 12 and second apparatus in the form of cleaning apparatus generally indicated by reference numeral 112. The first and second apparatus are arranged to perform successive steps in the method of the invention i.e. they operate in series. The second apparatus 112 is arranged generally below the first apparatus 12.

The first threshing apparatus 12 comprises a generally round cylindrical casing generally indicated by reference numeral 14 and defining a threshing zone generally indicated by reference numeral 16 about a threshing axis 20. The threshing axis 20 is arranged, in this embodiment, at an angle 21 which is between about 30° and about 45° from the horizontal.

The first threshing apparatus 12 comprises threshing means 18 operatively provided within the threshing zone 16.

Transport means 22, which is in the form of a screw conveyor or auger is arranged to transport harvested crop in the forms of ears, pods, or the like from a hopper 28 obliquely upwardly into the threshing zone 16. The screw conveyor 22 is conveniently co-axial with the axis 20.

A longitudinal boundary along a lower portion of the threshing zone 16 is defined by means of an arcuate, trough-like sieve 24 having perforations. The sieve 24 is arranged concentrically with the axis 20.

At one end, which is an upper end in use, of the threshing zone 16, there is provided a fan 26, co-axially with the threshing axis 20, to generate an air flow stream from the hopper 28, through the threshing zone, and to exhaust it via outlet conduiting 32. The fan 26 is of the centrifugal type and its inlet is thus on axis.

A common shaft or axle 30 acts as a tubular shaft over which flighting of the auger 22 is provided, and in series with the flighting, beater bars 18.1 of the threshing means are mounted on the shaft 30 to extend radially and longitudinally. Also the fan 26 is mounted on the shaft 30. In another embodiment, the fan 26 may be driven from the shaft 30 via a speed changing device.

Underneath the sieve 24, and generally parallel with the axis 20, there is provided a trough 34 which is, at its lower end, open as indicated at 36. The open end 36, in relation to the second apparatus 112, corresponds to or is analogous to the hopper 28 in relation to the first apparatus 12, and leads into transport means of the second cleaning apparatus 112.

Figure 2:
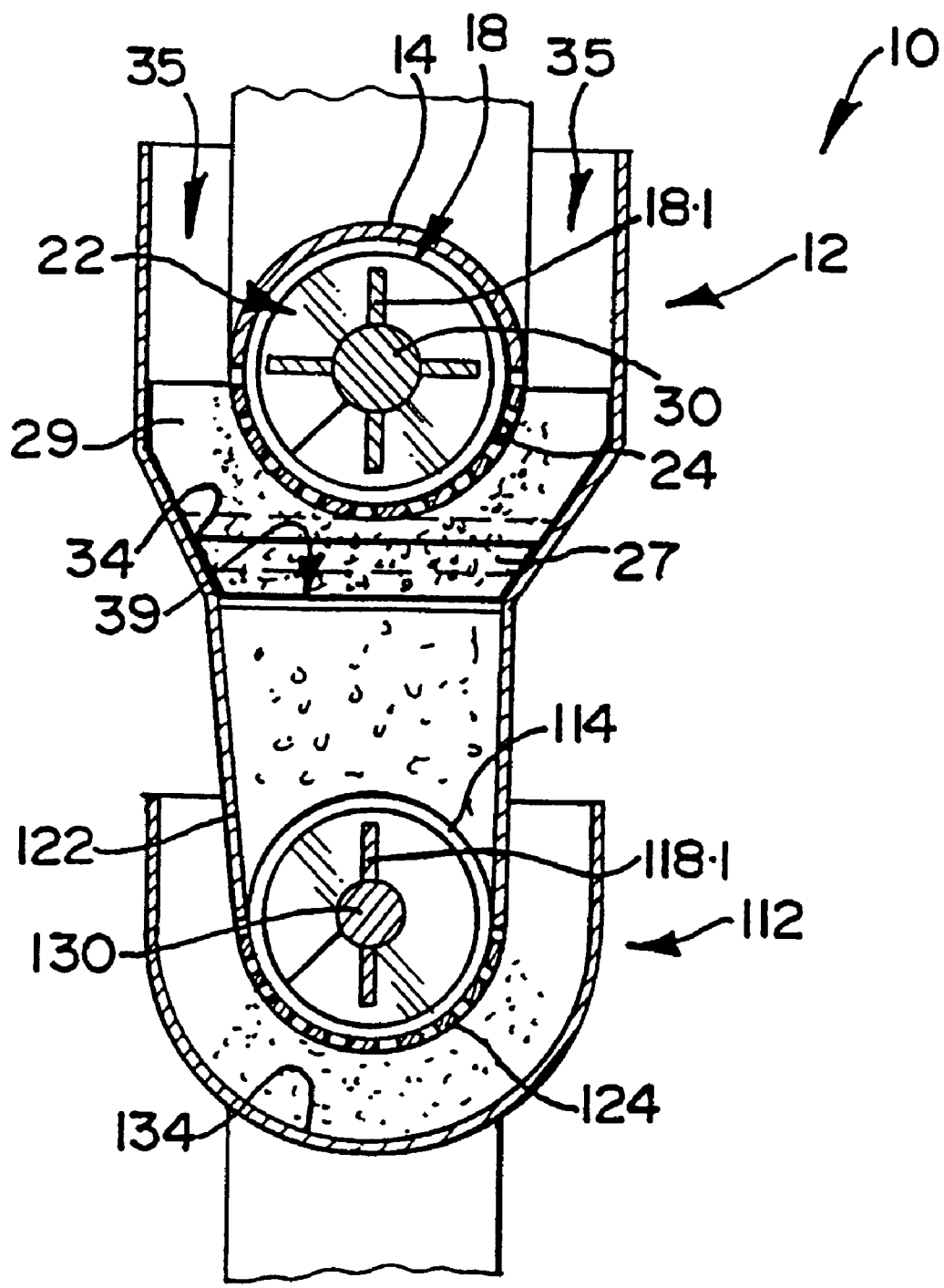
FIG. 2 shows a section taken at II—II in FIG. 1.

Air inlet openings 35, which are out of the plane of the section of FIG. 1 and which can be perceived from FIG. 2, allow air to be drawn via the trough 34 as shown at 37 into the fan 26. The inlet opening of the fan 26 is sufficiently large to have an influence outside the threshing zone 16. Air also flows via the opening between the trough 34 and the sieve 24 and via the openings in the sieve 24 to the central regions of the fan inlet. Such air flow lifts chaff off the sieve and carries the chaff to the fan.

A volute for the fan 26 is formed partially by a transverse baffle 27 at an upper end of the trough 34. The baffle 27 is mounted on the trough and extends upwardly from the trough. The baffle 27 is easily replaceable, e.g. to adjust its height. The baffle 27 provides a barrier to prevent grain, which, because of its relatively high density, is concentrated along the floor of the trough, from being drawn into the fan.

By way of development, a transverse intermediate baffle 29 is provided spaced upstream of the baffle 27. The baffle 29 depends from the sieve 24. It can readily be replaced to vary, for example, its height.

Free ends of the baffles 27 and 29 preferably overlap when seen in axial projection. The upstream baffle will deflect grain which has become airborne to prevent such airborne grain from being drawn into the fan. Furthermore, the baffles 27, 29 cause the auxiliary air flow stream to become circuitous to be directed momentarily generally into an auxiliary grain exit 39 which will be described hereinafter. The baffle 29 is advantageously opposite to a centre of the auxiliary grain exit 39.

It is to be appreciated that, because the sieve 24 and the trough 34 are merely arcuate or convex and not circular, the air flow stream 37 moves in a relatively narrow channel, thus making it more effective, alternatively requiring less air to be moved.

In use, harvested crops in the form of ears, pods, or the like fall under gravity into the hopper 28 to be transported obliquely upwardly as indicated at 44 into the threshing zone 16 by means of the transport means 22. In the threshing zone 16, the ears, pods or the like are threshed to liberate grain from chaff.

The chaff in the threshing zone 16 is carried by the flow stream through the fan 26 to be exhausted via the conduiting 32 as indicated at 48.

The grain falls under gravity and under centrifugal force through the air flow stream onto the sieve 24. The apertures of the sieve are selected to pass liberated grain with clearance. Thus, liberated grain, with an amount of relatively small pieces of chaff, fall into the trough 34 as indicated by reference numeral 46.

The small pieces of chaff are carried by the flow stream 37 along the trough 34.

In accordance with this invention, there is provided an aperture forming an auxiliary grain exit 39 (mentioned above) in the bottom of the trough 34 toward its downstream end. The baffle 27 may be at or proximate a downstream extremity of the auxiliary grain exit 39. The auxiliary grain exit 39 leads via an internal chamber 41 to the second apparatus 112.

Thus, grain which may be carried in the air flow stream 37, because of the relatively heavy weight compared to the weight of the small pieces of chaff, will tend to be at a low level, i.e. concentrated near the bottom of the trough 34. A portion of the air flow stream carrying such concentrated grain flows via the auxiliary grain exit 39 and the chamber 41 (which will be relatively stagnant in respect of airflow) into the apparatus 112. The baffle 27 greatly assists the above mechanism. Thus, virtually only the small pieces of chaff exit via the fan 26 and the outlet 32.

The length of the grain exit may be between 25% and 75%, typically about 50% of the length of the trough 34 which is about equal in length to the sieve 24. The projected width of the grain exit may be about equal to the projected width of the sieve. The height of the chamber 41 may be about equal to the spacing between the sieve and the trough.

As mentioned above, interaction of the baffles 27, 29 and the auxiliary air flow stream causes the flow stream to become circuitous around the end of the baffle 29. Grain, carried in the auxiliary air flow stream and which will tend to progress tangentially on account of inertia as a result of relatively high density, will be directed generally into the auxiliary grain exit 39. In contrast, chaff, being of relatively low density, will tend to follow the auxiliary air flow stream to be exhausted.

The major portion of the liberated grain 46 slides along the trough 34 via the open end 36, which forms a main grain exit in the context of this invention, onto the transport means 122 of the second, cleaning apparatus 112.

The applicant is of opinion that approximately 25% of the librated grain exit the first apparatus 12 via the auxiliary grain exit 39, and the balance of about 75% via the main grain exit 36. This ratio is influenced by and can be adjusted by adjusting the velocity or speed of the airflow stream.

Furthermore, the heights of the baffles 27, 29 and thus their overlap, can be adjusted by replacing one or both of them with baffles having different lengths.

The second, cleaning, apparatus 112 is similar to the first, threshing, apparatus 12 and is not again described. Like reference numerals refer to like components or features. Reference numeral 118.1 indicates stirring bars or agitating bars in place of the beater bars 18.1.

Grain exiting the apertures via the main grain exit 36, is transported into the cleaning zone. 116 by transport means 122. The grain exiting via the auxiliary grain exit 39 falls directly into the cleaning zone 116.

Cleaned grain 146 is discharged from the threshing apparatus 10 via an outlet 136 where it is collected. Chaff is exhausted via the conduiting 32 and 132.

If desired, a recirculating grain exit may be provided in the trough 134 analogous to and in a position corresponding to the auxiliary grain exit. Products exiting such recirculating grain exit can then be recirculated or returned, either via the hopper 28, or via the transport means 122.

The Applicant believes that, in many applications, threshing by means of the first, threshing, apparatus 12 will provide adequately cleaned grain and that a second step, which will merely be a cleaning step, will not be required. Thus, in those applications, grain will be collected from the open end 36, and the products from the auxiliary grain exit 39 will be returned to or recirculated to the hopper 28.

It is a first advantage that grain and chaff are separated already in the threshing zone 16. This is conducive to simplicity of design and effectiveness in operation. Transport of the liberated grain and chaff is facilitated and the threshing apparatus can be provided less expensively than comparable threshing apparatus of which the Applicant is aware.

It is further an advantage that the sieve 24 is stationary as it is operated by means of gravity and centrifugal forces, operating on the liberated grain.

It is a further advantage that the sieve through which the liberated grain is passed is merely arcuate and not fully cylindrical. Provision of an arcuate or, in this case, semi-cylindrical sieve is adequate and allows a saving in cost.

The provision of the auxiliary grain exit allows the intensity of the air flow stream to be greatly increased without aggravating loss of grain through the outlet 32. This enhances the cleaning action. This is especially advantageous with small or light grain such as wheat. The Applicant is of opinion that the provision of such an auxiliary grain exit, especially in association with the baffle downstream thereof and also the opposing baffle, allows the capacity of the apparatus to be increased substantially. With light and/or small grain kernels, the capacity can be increased by 100% or more in some applications. The Applicant believes that such an improvement can be achieved because of the enhanced cleaning action because of the increased air flow stream intensity.

What is claimed is:

1. A method of threshing harvested grain including ears and pods, the method including performing a threshing action on the harvested grain in a longitudinal threshing zone having an open inlet end for introducing of the harvested grain into the threshing zone and an open outlet end opposed to the open inlet end, for exhaust of chaff, the thresing zone being bounded, at least along a lower extremity thereof, by a trough-like sieve having a sieve axis and being arranged longitudinally adjacent said longitudinal threshing zone; causing a first air flow stream of predetermined force or intensity to move longitudinally through the threshing zone and to be exhausted via said open outlet end, perforations of the sieve being selected to pass grain liberated during threshing with little clearance, the force or intensity of the first air flow stream being predetermined to carry chaff of relatively low density out of the threshing zone via said open outlet end and to allow liberated grain of relatively high density to fall onto the sieve;

gathering grain and smaller portions of chaff passed by the sieve in a longitudinal trough spaced longitudinally underneath the sieve and having opposed ends;

causing an auxiliary air flow stream of predetermined force or intensity to move longitudinally through a space intermediate the sieve and the trough to carry such smaller portions of chaff out of said space while allowing the grain to fall into the trough;

providing a main grain exit for the trough toward one end of the trough which is an upstream end relative to said auxiliary air flow stream and causing a major portion of the grain to move toward and to exit via said main grain exit;

providing an auxiliary grain exit through the trough toward said other end of the trough which other end is a downstream end relative to said auxiliary air flow stream to allow the grain remaining in the trough and any remaining chaff to pass through the auxiliary grain exit.

2. A method as claimed in claim 1 which includes barring a portion of the space intermediate the sieve and the trough, at a longitudinal position closely downstream of the auxiliary grain exit, by means of a transverse end baffle extending from a bottom of the trough.

3. A method as claimed in claim 2 which includes barring a portion of the space intermediate the sieve and the trough at a longitudinal position opposite the auxiliary grain exit and upstream of said transverse end baffle by means of a transverse intermediate baffle extending from the sieve, to cause the auxiliary air flow stream to follow a circuitous route past the intermediate and end baffles.

4. A method as claimed in claim 1 which includes arranging the threshing zone and the trough generally parallel at an inclined attitude such that the directions of flow of the first air flow stream and the auxiliary air flow stream are obliquely upwardly.

5. A method as claimed in claim 1 including passing the grain and any chaff from the auxiliary grain exit to a longitudinal cleaning zone, which has an open inlet end and an open outlet end opposed to said inlet end, which is bounded at least along a lower extremity thereof by a cleaning zone sieve which is separate and apart from said sieve bounding the threshing zone, said cleaning zone sieve being of trough-like shape having an axis and extending longitudinally adjacent the cleaning zone, the auxiliary grain exit being directed at said cleaning zone sieve;

agitating or stirring said grain and chaff by means of a rotor which is arranged along the cleaning zone; and causing a cleaning air flow stream of predetermined force or intensity to move longitudinally through the cleaning zone past said auxiliary grain exit toward said open outlet end of said longitudinal cleaning zone and exit via said open outlet end of said longitudinal cleaning zone, perforations of the cleaning zone sieve being selected to pass cleaned grain with little clearance, the force or intensity of the cleaning air flow stream being predetermined to carry chaff of relative low density out of the cleaning zone via said open outlet end and to allow cleaned grain of relatively high density to fall onto the cleaning zone sieve.

6. A method as claimed in claim 5 which includes transporting grain from the main grain exit to said open inlet end of the cleaning zone at a longitudinal position upstream, in relation to the cleaning air flow stream, of the auxiliary grain exit, subjecting said grain from the main grain exit to the cleaning air flow stream to carry any chaff off and to allow grain to pass through the cleaning zone sieve.

7. A threshing apparatus suitable for use in threshing harvested grain including ears and pods, the threshing apparatus comprising a casing defining a longitudinal threshing zone having an open inlet end for introduction of the harvested grain into the threshing zone and an open outlet end opposed to the open inlet end, for exhaust of chaff, and including a sieve bounding at least a lower extremity of the threshing zone, the sieve being of trough-like shape having a sieve axis and being arranged longitudinally adjacent said longitudinal threshing zone;

transport means arranged to transport the harvested grain into the threshing zone via said open inlet end;

threshing means arranged to thresh the harvested grain in the threshing zone;

air flow stream generating means arranged to move air in a first air flow stream longitudinally through the threshing zone in a direction toward said open outlet end and to be exhausted via said open outlet end;

a longitudinal trough having opposed ends and being spaced longitudinally underneath the sieve;

auxiliary air flow generating means arranged to move air in an auxiliary air flow stream longitudinally through a space intermediate the sieve and the trough in a direction generally parallel to said first air flow stream;

a main grain exit toward one end of the trough which is an upstream end in relation to the auxiliary air flow stream and an auxiliary grain exit through the trough toward said opposed end which is a downstream end of the trough, the arrangement being such that grain, liberated during threshing, falls onto the sieve, perforations of the sieve being selected to pass such liberated grain with little clearance, such that chaff is carried in the first air flow stream out of the threshing zone via said open outlet end, such that grain and smaller portions of chaff passed by the sieve fall toward the trough to be exposed to the auxiliary air flow steam, the smaller portions of chaff being carried longitudinally out of the space on the auxiliary air flow stream, such that a major portion of the grain exits the space via the main grain exit, and such that the balance of the grain and any chaff remaining in the grain exit the space via the auxiliary grain exit.

8. Threshing apparatus as claimed in claim 7 in which the threshing zone is generally round cylindrical, having a threshing axis which is inclined at an angle of at least 20° from the horizontal, the sieve being correspondingly cylindrically arcuate or convex and being arranged generally concentrically of the threshing axis, the trough being arranged generally parallel to and underneath the sieve.

9. Threshing apparatus as claimed in claim 7 which includes a transverse end baffle extending upwardly from the trough partially into a space intermediate the trough and the sieve at a longitudinal position closely downstream of the auxiliary grain exit to bar a corresponding portion of said space.

10. Threshing apparatus as claimed in claim 9 which includes a transverse intermediate baffle extending downwardly from the sieve partially into said space at a longitudinal position opposite the auxiliary grain exit, to bar a corresponding portion of said space, thus to cause the auxiliary air flow stream to follow a circuitous route past the intermediate and end baffles in use.

11. Threshing apparatus as claimed in claim 7 including a second, cleaning zone casing defining a longitudinal cleaning zone which has an open inlet end and an open outlet end opposite the inlet end, the cleaning zone being exposed to said auxiliary grain exit;

a second, cleaning zone sieve bounding at least a lower extremity of the cleaning zone the cleaning zone sieve being separate and apart from said sieve bounding the threshing zone, said cleaning zone sieve being of trough-like shape having an axis and extending longitudinally adjacent the cleaning zone;

agitating or stirring means including a rotor arranged along the cleaning zone to agitate or stir grain and any chaff it may contain received in the cleaning zone from the auxiliary grain exit; and cleaning air flow stream generating means arranged to move air in a cleaning air flow stream longitudinally through the cleaning zone and to be exhausted via said open outlet end of the cleaning zone, the arrangement being such that grain, cleaned during agitating or stirring, falls onto the cleaning zone sieve, perforations of the cleaning zone sieve being selected to pass such cleaned grain with little clearance, and such that chaff is carried in the cleaning air flow steam longitudinally out of the cleaning zone via the open outlet end of the cleaning zone.

12. Threshing apparatus as claimed in claim 11 which includes a passage from the main grain exit to the inlet end of the cleaning zone upstream of the exit of the auxiliary grain exit.

* * * * *